US011004024B2

(12) United States Patent
Wang

(10) Patent No.: US 11,004,024 B2
(45) Date of Patent: May 11, 2021

(54) SERVICE AND RESOURCE ORCHESTRATION SYSTEM AND METHOD, AND APPARATUS

(71) Applicant: Huawei Technologies Co., Ltd., Shenzhen (CN)

(72) Inventor: Fengbao Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 583 days.

(21) Appl. No.: 15/963,892

(22) Filed: Apr. 26, 2018

(65) Prior Publication Data

US 2018/0247244 A1 Aug. 30, 2018

Related U.S. Application Data

(63) Continuation of application No. PCT/CN2016/087068, filed on Jun. 24, 2016.

(30) Foreign Application Priority Data

Oct. 27, 2015 (CN) .......................... 201510706275.1

(51) Int. Cl.
*G06F 9/50* (2006.01)
*G06Q 10/06* (2012.01)
*H04L 12/24* (2006.01)

(52) U.S. Cl.
CPC ..... *G06Q 10/06315* (2013.01); *G06F 9/5005* (2013.01); *G06F 9/5011* (2013.01);
(Continued)

(58) Field of Classification Search
None
See application file for complete search history.

(56) References Cited

U.S. PATENT DOCUMENTS 9,503,345 B2 * 11/2016 Caminiti ............. H04L 41/5096
9,569,193 B2 * 2/2017 Pallamreddy ............ G06F 8/65
(Continued)

FOREIGN PATENT DOCUMENTS

CN 101969391 A 2/2011
CN 102158498 A 8/2011
(Continued)

OTHER PUBLICATIONS

Rubio-Loyala, et al., "Scalable Service Deployment on Software-Defined Networks," IEEE Communications Magazine, XP011379710, Dec. 1, 2011, pp. 84-93.
(Continued)

*Primary Examiner* — Kenny S Lin
(74) *Attorney, Agent, or Firm* — Slater Matsil, LLP

(57) ABSTRACT

A service and resource orchestration system includes an orchestration apparatus, configured to: obtain order information of a customized service; obtain meta information of the customized service from a catalog apparatus, where the meta information is used to describe resource requirement information and a resource selection policy of the customized service; obtain, from a planning resource providing apparatus or a current instance apparatus according to the order information, the resource requirement information, and the resource selection policy, a resource required by the customized service; and generate instance data of the customized service. The system also may include a check apparatus configured to process currently running instance data obtained from the current instance apparatus and the instance data of the customized service to obtain final instance data for a network.

20 Claims, 11 Drawing Sheets

(52) U.S. Cl.
CPC ... *G06Q 10/06313* (2013.01); *H04L 41/5041* (2013.01); *H04L 41/5045* (2013.01)

(56) References Cited

U.S. PATENT DOCUMENTS

| | | | |
|---|---|---|---|
| 10,235,160 B2* | 3/2019 | Choudhari | G06F 8/65 |
| 2008/0071911 A1 | 3/2008 | Holbrook et al. | |
| 2011/0087522 A1 | 4/2011 | Beaty et al. | |
| 2011/0209140 A1* | 8/2011 | Scheidel | G06F 8/60 |
| | | | 717/172 |
| 2012/0124584 A1 | 5/2012 | Addala et al. | |
| 2012/0239452 A1 | 9/2012 | Trivedi et al. | |
| 2014/0074905 A1 | 3/2014 | Schincariol et al. | |
| 2014/0075032 A1* | 3/2014 | Vasudevan | H04L 41/5048 |
| | | | 709/226 |
| 2014/0108506 A1 | 4/2014 | Borzycki et al. | |
| 2014/0244820 A1 | 8/2014 | Shumian et al. | |
| 2015/0066560 A1 | 3/2015 | Madani et al. | |
| 2015/0074279 A1* | 3/2015 | Maes | G06F 9/5072 |
| | | | 709/226 |
| 2015/0081902 A1 | 3/2015 | Verchere et al. | |
| 2015/0304231 A1* | 10/2015 | Gupte | H04L 47/70 |
| | | | 709/226 |
| 2016/0205037 A1* | 7/2016 | Gupte | H04L 47/808 |
| | | | 709/226 |

FOREIGN PATENT DOCUMENTS

| | | |
|---|---|---|
| CN | 102467701 A | 5/2012 |
| CN | 102624684 A | 8/2012 |
| CN | 103152197 A | 6/2013 |
| CN | 104487948 A | 4/2015 |
| CN | 105281955 A | 1/2016 |
| EP | 2453357 A2 | 5/2012 |
| GB | 2503464 A | 1/2014 |

OTHER PUBLICATIONS

OMG Unified Modeling LanguageLanguage™ (OMG UML), Infrastructure, Version 2.3 without change bars, May 2010, 226 pages.

* cited by examiner

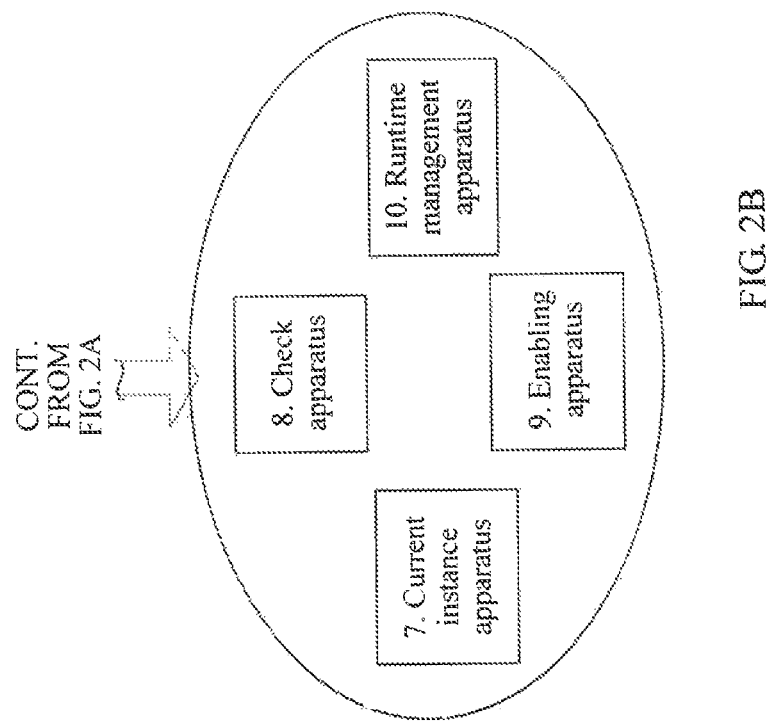

SERVICE AND RESOURCE ORCHESTRATION SYSTEM AND METHOD, AND APPARATUS

CROSS-REFERENCE TO RELATED APPLICATIONS

This application is a continuation of International Application No. PCT/CN2016/087068, filed on Jun. 24, 2016, which claims priority to Chinese Patent Application No. 201510706275.1, filed on Oct. 27, 2015. The disclosures of the aforementioned applications are hereby incorporated by reference in their entireties.

TECHNICAL FIELD

The present disclosure relates to the field of communications technologies, and in particular, to a service and resource orchestration system and method, and an apparatus.

BACKGROUND

When a network is increasingly complex, an operator faces pressure of competition and a customer requirement. With development of an Internet service and intelligent mobile broadband application, a customer has increasingly diverse requirements and expects that a time from completion of service development preparation to release and selling of a service to the market: a time to market (Time To Market, TTM for short) and a time from user service subscription to availability of the service: a time to customer (Time To Customer, TTC for short) are greatly shortened. A gradually mature virtualization technology and cloudification technology provide more possibilities and convenience for shortening the TTM and the TTC, and therefore become common and urgent requirements. During current development of a service, after a user proposes a service requirement, development is performed for the service, and then a corresponding resource is orchestrated for the service and is provided for the user. Consequently, service and resource orchestration efficiency is low.

SUMMARY

To resolve low service and resource orchestration efficiency in the prior art, embodiments of the present invention provide a service and resource orchestration system and method, and an apparatus, so that a resource can be automatically orchestrated and run for a customized service, and service and resource orchestration efficiency is improved.

A first aspect of the present disclosure provides a service and resource orchestration system, including: an orchestration apparatus, a catalog apparatus, a planning resource providing apparatus, a check apparatus, a current instance apparatus, and an enabling apparatus. The orchestration apparatus is configured to obtain order information of a customized service; obtain meta information of the customized service from the catalog apparatus, where the meta information is used to describe resource requirement information and a resource selection policy of the customized service; obtain, from the planning resource providing apparatus or the current instance apparatus according to the order information, the resource requirement information, and the resource selection policy, a resource required by the customized service; and generate instance data of the customized service, where the customized service is a service released on the catalog apparatus. The check apparatus is configured to process currently running instance data obtained from the current instance apparatus and the instance data of the customized service to obtain final instance data suitable for a network. The enabling apparatus is configured to configure the final instance data on a network element, where the final instance data runs on the network element, to provide a user with a service corresponding to the customized service.

During current development of a service in the prior art, after a user proposes a service requirement, development is performed for the service, and then a corresponding resource is orchestrated for the service and is provided for the user for use. Consequently, service and resource orchestration efficiency is low. In contrast, according to the service and resource orchestration system provided in this embodiment of the present invention, a resource may be automatically orchestrated and run for the customized service, thereby improving service and resource orchestration efficiency.

With reference to the first aspect, in a first possible implementation, the meta information further includes an orchestration algorithm. The orchestration apparatus is also further configured to: after obtaining the resource required by the customized service, decompose the customized service, and configure a required resource for a decomposed customized service according to the orchestration algorithm.

With reference to the first aspect or the first possible implementation of the first aspect, in a second possible implementation, the check apparatus being configured to process currently running instance data includes that the check apparatus is specifically configured to process the instance data of the customized service and the currently running instance data to obtain expected network running data, where the expected network running data meets a network running requirement, and obtain the final instance data of the customized service according to the expected network running data and the currently running instance data.

With reference to the second possible implementation of the first aspect, in a third possible implementation, the processing the instance data of the customized service and the currently running instance data to obtain expected network running data includes combining the instance data of the customized service and the currently running instance data to obtain combined data, performing network enabling check on the combined data, and when the network enabling check fails, adjusting the combined data to obtain the expected network running data that meets the network running requirement.

With reference to any one of the first aspect or the first to the third possible implementations of the first aspect, in a fourth possible implementation, the system further includes an orchestration control apparatus, where the orchestration control apparatus is configured to obtain the order information of the customized service from a service customization platform, and provide the order information of the customized service for the orchestration apparatus. The orchestration control apparatus is further configured to receive the instance data that is of the customized service and sent by the orchestration apparatus, and send the instance data of the customized service to the check apparatus. The orchestration control apparatus is still further configured to receive the final instance data sent by the check apparatus, and send the final instance data to the enabling apparatus.

With reference to the fourth possible implementation of the first aspect, in a fifth possible implementation, the system further includes a runtime control apparatus. Also, the orchestration control apparatus is further configured to trigger the runtime control apparatus to load software corresponding to the customized service, and the time control apparatus is further configured to control a lifecycle of the software.

With reference to the fourth possible implementation of the first aspect, in a sixth possible implementation, the orchestration control apparatus is further configured to register the final instance data of the customized service with the current instance apparatus, and the current instance apparatus is configured to manage the final instance data of the customized service.

A second aspect of the present disclosure provides a service and resource orchestration method, where the method is applied to a service and resource orchestration system, where the system includes: an orchestration apparatus, a catalog apparatus, a planning resource providing apparatus, a check apparatus, a current instance apparatus, and an enabling apparatus. The method includes: obtaining, by the orchestration apparatus, order information of a customized service, where the customized service is a service released on the catalog apparatus. The method also includes obtaining, by the orchestration apparatus, meta information of the customized service from the catalog apparatus, where the meta information is used to describe resource requirement information and a resource selection policy of the customized service. The method further includes obtaining, by the orchestration apparatus from the planning resource providing apparatus and the current instance apparatus according to the order information, the resource requirement information, and the resource selection policy, a resource required by the customized service, and generating instance data of the customized service, where the instance data of the customized service is used for obtaining final instance data suitable for a network by the check apparatus, and data obtained after the enabling apparatus performs interface data conversion on the final instance data runs on a network element, to provide a user with a service corresponding to the customized service.

According to the service and resource orchestration method provided in this embodiment of the present invention, a resource may be automatically orchestrated and run for the customized service, thereby improving service and resource orchestration efficiency.

With reference to the second aspect, in a first possible implementation, the meta information further includes an orchestration algorithm; and after obtaining the resource required by the customized service, the orchestration apparatus decomposes the customized service, and configures a required resource for a decomposed customized service according to the orchestration algorithm.

With reference to the second aspect or the first possible implementation of the second aspect, in a second possible implementation, the obtaining includes: obtaining, by the orchestration apparatus, the order information of the customized service from an orchestration control apparatus, where the order information of the customized service is obtained by the orchestration control apparatus from a service customization platform.

A third aspect of the present disclosure provides a service and resource orchestration method. The method is applied to a service and resource orchestration system which includes: an orchestration apparatus, a catalog apparatus, a check apparatus, a current instance apparatus, and an enabling apparatus. The method includes obtaining, by the check apparatus, instance data of a customized service from the orchestration apparatus, and obtaining currently running instance data from the current instance apparatus, where the customized service is a service released on the catalog apparatus. The method also includes processing, by the check apparatus, the instance data of the customized service and the currently running instance data to obtain final instance data suitable for a network, where data obtained after the enabling apparatus performs interface data conversion on the final instance data runs on a network element, to provide a user with a service corresponding to the customized service.

According to the service and resource orchestration method provided in this embodiment of the present invention, a resource may be automatically orchestrated and run for the customized service, thereby improving service and resource orchestration efficiency.

With reference to the third aspect, in a first possible implementation, the processing, by the check apparatus, the instance data includes: processing, by the check apparatus, the instance data of the customized service and the currently running instance data to obtain expected network running data, where the expected network running data meets a network running requirement; and obtaining, by the check apparatus, the final instance data suitable for a network according to the expected network running data and the currently running instance data.

With reference to the first possible implementation of the third aspect, in a second possible implementation, the processing, by the check apparatus, the instance data of the customized service and the currently running instance data to obtain expected network running data includes: combining, by the check apparatus, the instance data of the customized service and the currently running instance data to obtain combined data; performing, by the check apparatus, network enabling check on the combined data; and when the network enabling check fails, adjusting, by the check apparatus, the combined data to obtain the expected network running data that meets the network running requirement.

A fourth aspect of the present disclosure provides an orchestration apparatus. The apparatus is applied to a service and resource orchestration system. The system includes: a catalog apparatus, a planning resource providing apparatus, a check apparatus, a current instance apparatus, and an enabling apparatus. The orchestration apparatus includes a first obtaining unit, configured to obtain order information of a customized service, where the customized service is a service released on the catalog apparatus. The orchestration apparatus also includes a second obtaining unit, configured to obtain, from the catalog apparatus, meta information of the customized service obtained by the first obtaining unit, where the meta information is used to describe resource requirement information and a resource selection policy of the customized service. The orchestration apparatus further includes an orchestration unit, configured to: obtain, from the planning resource providing apparatus and the current instance apparatus according to the order information, the resource requirement information, and the resource selection policy obtained by the second obtaining unit, a resource required by the customized service, and generate instance data of the customized service, where the instance data of the customized service is used for obtaining final instance data suitable for a network, and data obtained after the enabling apparatus performs interface data conversion on the final instance data runs on a network element, to provide a user with a service corresponding to the customized service.

The orchestration apparatus provided in this embodiment of the present invention may automatically orchestrate and run a resource for the customized service, thereby improving service and resource orchestration efficiency.

With reference to the fourth aspect, in a first possible implementation, the orchestration unit is further configured to, after obtaining the resource required by the customized service, decompose the customized service, and configure a required resource for a decomposed customized service according to the orchestration algorithm.

With reference to the fourth aspect or the first possible implementation of the fourth aspect, in a second possible implementation, the first obtaining unit is specifically configured to obtain the order information of the customized service from an orchestration control apparatus, where the order information of the customized service is obtained by the orchestration control apparatus from a service customization platform.

A fifth aspect of the present disclosure provides a check apparatus, the check apparatus being applied to a service and resource orchestration system. The system includes: an orchestration apparatus, a catalog apparatus, a current instance apparatus, and an enabling apparatus. The check apparatus includes an obtaining unit, configured to obtain instance data of a customized service from the orchestration apparatus, and obtain currently running instance data from the current instance apparatus, where the customized service is a service released on the catalog apparatus. The check apparatus further includes a check unit, configured to process the instance data of the customized service and the currently running instance data that are obtained by the obtaining unit, to obtain final instance data suitable for a network, where data obtained after the enabling apparatus performs interface data conversion on the final instance data runs on a network element, to provide a user with a service corresponding to the customized service.

The check apparatus provided in this embodiment of the present invention may automatically orchestrate and run a resource for the customized service, thereby improving service and resource orchestration efficiency.

With reference to the fifth aspect, in a first possible implementation, the check unit is specifically configured to: process the instance data of the customized service and the currently running instance data to obtain expected network running data, where the expected network running data meets a network running requirement; and obtain the final instance data suitable for a network according to the expected network running data and the currently running instance data.

With reference to the first possible implementation of the fifth aspect, in a second possible implementation, the check unit is specifically configured to: combine the instance data of the customized service and the currently running instance data to obtain combined data; perform network enabling check on the combined data; and when the network enabling check fails, adjust the combined data to obtain the expected network running data that meets the network running requirement.

A sixth aspect of the present disclosure provides an orchestration apparatus, including: an input/output device, a memory, and a processor, where the memory is configured to store a program of performing service and resource orchestration by the processor. The input/output device is configured to: obtain order information of a customized service, where the customized service is a service released on the catalog apparatus; obtain meta information of the customized service from the catalog apparatus, where the meta information is used to describe resource requirement information and a resource selection policy of the customized service; and obtain, from the planning resource providing apparatus and the current instance apparatus according to the order information, the resource requirement information, and the resource selection policy, a resource required by the customized service. The processor is configured to generate instance data of the customized service, where the instance data of the customized service is used for obtaining final instance data suitable for a network by the check apparatus, and data obtained after the enabling apparatus performs interface data conversion on the final instance data runs on a network element, to provide a user with a service corresponding to the customized service.

According to the service and resource orchestration method provided in this embodiment of the present invention, a resource may be automatically orchestrated and run for the customized service, thereby improving service and resource orchestration efficiency.

A seventh aspect of the present disclosure provides a check apparatus, including: an input/output device, a memory, and a processor, where the memory is configured to store a program of performing service and resource orchestration by the processor. The input/output device obtains instance data of a customized service from the orchestration apparatus, and obtains currently running instance data from the current instance apparatus, where the customized service is a service released on the catalog apparatus. The processor processes the instance data of the customized service and the currently running instance data to obtain final instance data suitable for a network, where data obtained after the enabling apparatus performs interface data conversion on the final instance data runs on a network element, to provide a user with a service corresponding to the customized service.

During current development of a service in the prior art, after a user proposes a service requirement, development is performed for the service, and then a corresponding resource is orchestrated for the service and is provided for the user for use. Consequently, service and resource orchestration efficiency is low. In contrast, according to the service and resource orchestration system provided in the embodiments of the present invention, a resource may be automatically orchestrated and run for the customized service, thereby improving service and resource orchestration efficiency.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person skilled in the art may still derive other drawings from these accompanying drawings without creative efforts.

FIG. 2A and FIG. 2B are a schematic diagram of another embodiment of a service and resource orchestration system according to an embodiment of the present invention;

DETAILED DESCRIPTION OF ILLUSTRATIVE EMBODIMENTS

Embodiments of the present invention provide a service and resource orchestration system and method, and an apparatus, and a resource may be automatically orchestrated and run for a customized service, thereby improving service and resource orchestration efficiency. The embodiments of the present invention further provide a corresponding apparatus and system. The following separately provides detailed descriptions.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present disclosure.

Figure 1A:
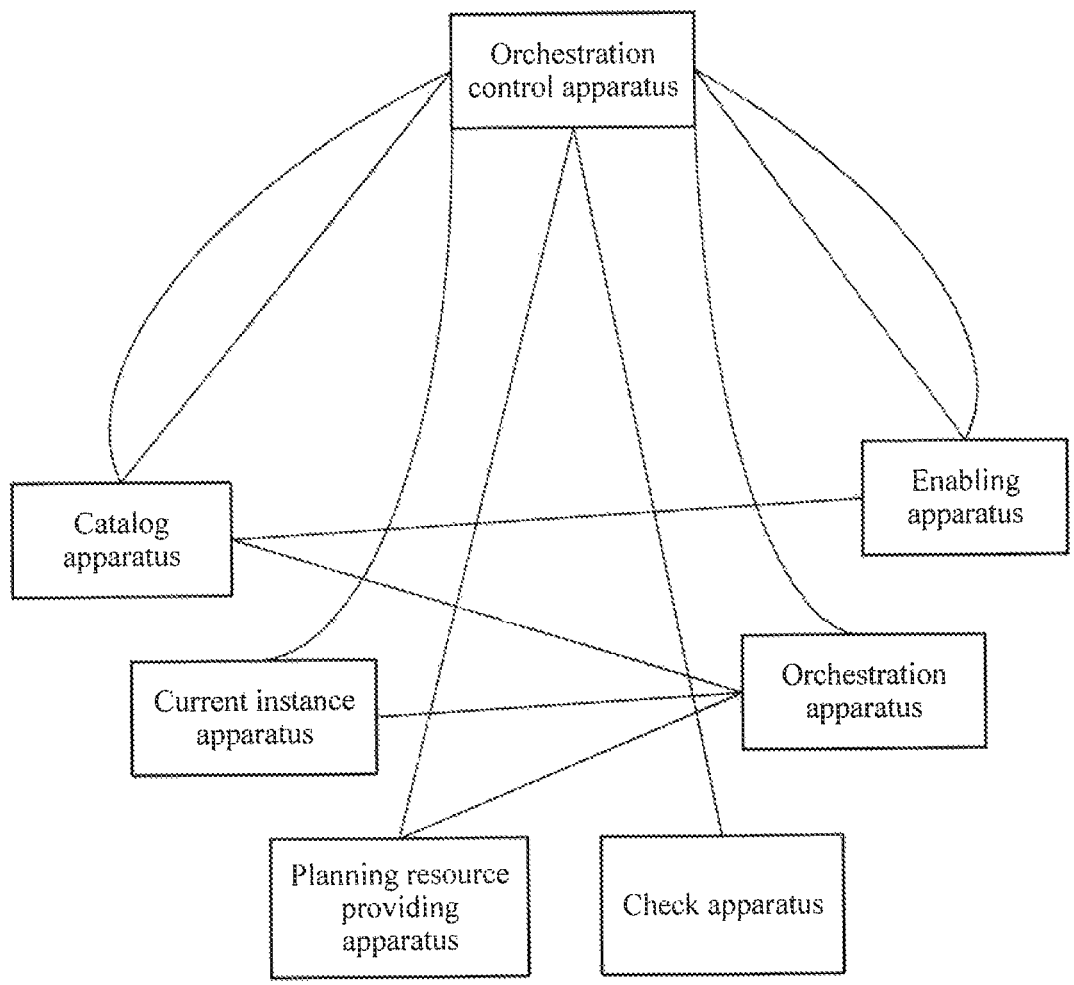
FIG. 1A is a schematic diagram of an embodiment of a service and resource orchestration system according to an embodiment of the present invention.

FIG. 1A is a schematic diagram of an embodiment of a service and resource orchestration system according to an embodiment of the present invention.

This embodiment of the service and resource orchestration system provided in this embodiment of the present invention includes: an orchestration apparatus, a catalog apparatus, a planning resource providing apparatus, a check apparatus, a current instance apparatus, and an enabling apparatus.

The orchestration apparatus is configured to: obtain order information of a customized service; obtain meta information of the customized service from the catalog apparatus, where the meta information is used to describe resource requirement information and a resource selection policy of the customized service; obtain, from the planning resource providing apparatus or the current instance apparatus according to the order information, the resource requirement information, and the resource selection policy, a resource required by the customized service; and generate instance data of the customized service, where the customized service is a service released on the catalog apparatus.

The check apparatus is configured to process currently running instance data obtained from the current instance apparatus and the instance data of the customized service to obtain final instance data suitable for a network.

The enabling apparatus is configured to configure the final instance data on a network element, where the final instance data runs on the network element, to provide a user with a service corresponding to the customized service.

During current development of a service in the prior art, after a user proposes a service requirement, development is performed for the service, and then a corresponding resource is orchestrated for the service and is provided for the user for use. Consequently, service and resource orchestration efficiency is low. In contrast, according to the service and resource orchestration system provided in this embodiment of the present invention, a resource may be automatically orchestrated and run for the customized service, thereby improving service and resource orchestration efficiency.

Figure 1B:
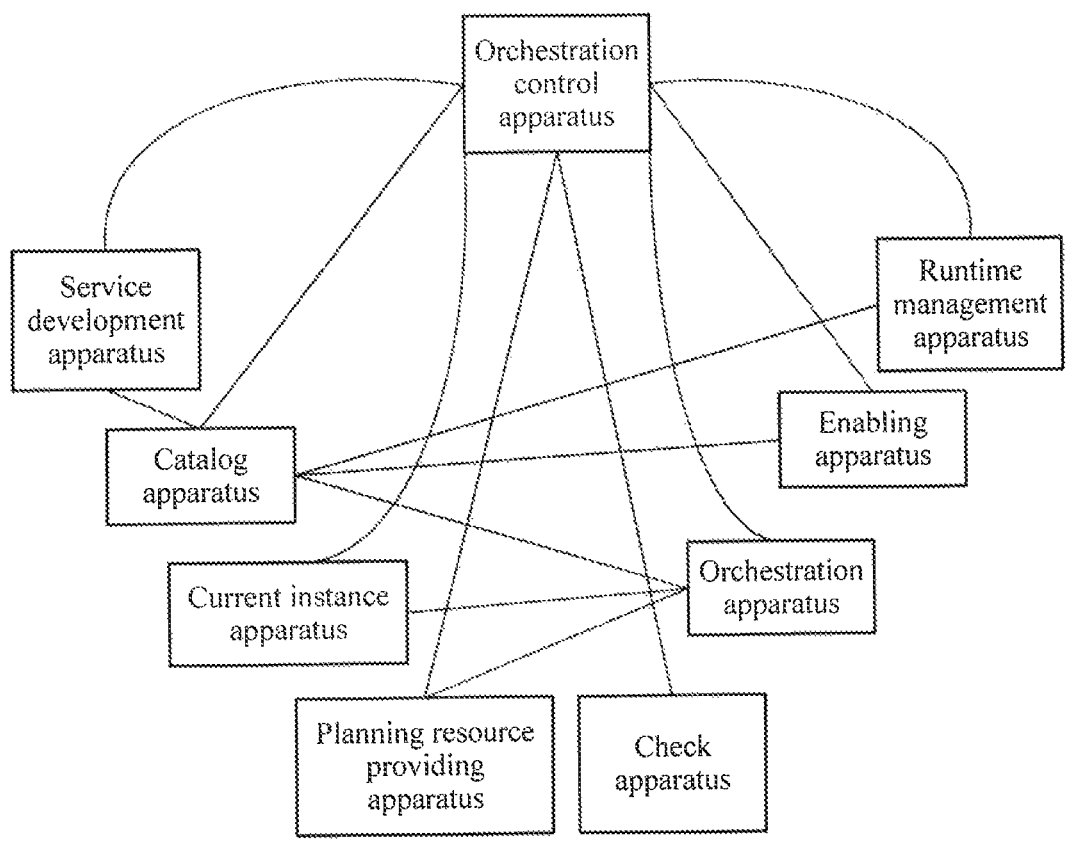
FIG. 1B is a schematic diagram of an embodiment of a service and resource orchestration system according to an embodiment of the present invention.

As shown in FIG. 1B, an embodiment of a service and resource orchestration system provided in an embodiment of the present invention includes: an orchestration control apparatus, a service development (or develop) apparatus, a catalog apparatus, a current instance (or current) apparatus, a planning resource providing (or prepare) apparatus, a check (or plan) apparatus, an orchestration apparatus, an enabling (or activation) apparatus, and a runtime management (or runtime) apparatus. The orchestration control apparatus separately communicates with and is separately connected to the service development apparatus, the catalog apparatus, the current instance apparatus, the planning resource providing apparatus, the check apparatus, the orchestration apparatus, the enabling apparatus, and the runtime management apparatus. The orchestration control apparatus, the service development apparatus, the catalog apparatus, the current instance apparatus, the planning resource providing apparatus, the check apparatus, the orchestration apparatus, the enabling apparatus, and the runtime management apparatus each may be an independent physical host or service, or may be multiple virtual machines or services arranged on one physical host, or may be virtual machines or services separately arranged on multiple physical hosts.

The orchestration control apparatus is configured to: control service and resource orchestration, and obtain order information of a customized service from a service customization platform.

The service development apparatus is development space in which a service developer performs service model (simply referred to as a service package) definition, provides a service development environment, provides an available service package, and checks dependency relationships between service packages. After service development is completed, a service developed on the service development apparatus is transmitted to the catalog apparatus for on-shelf display. In this embodiment of the present invention, during service development, the service development apparatus provides a uniform compiled language for an engineer.

The catalog apparatus is configured to: display a released service, and store meta information of the service and a template of the service. The meta information is used for establishing instance data of the service. The meta information may include class definition information, inter-class relationship definition information, and model conversion script of a service, a selection policy and an orchestration algorithm of a specific resource, and the like.

The current instance apparatus is configured to store currently running instance data. The running instance data in the current instance apparatus represents a current network status.

The orchestration apparatus is configured to: obtain the order information of the customized service; obtain meta information of the customized service from the catalog apparatus, where the meta information is used to describe resource requirement information and a resource selection policy of the customized service; obtain, from the planning resource providing apparatus or the current instance apparatus according to the order information, the resource requirement information, and the resource selection policy, a resource required by the customized service; and generate instance data of the customized service, where the customized service is a service released on the catalog apparatus.

The orchestration apparatus is further configured to: after obtaining the resource required by the customized service, decompose the customized service, and configure a required resource for a decomposed customized service according to the orchestration algorithm.

In this embodiment of the present invention, for orchestration, all possible orchestration is abstracted and summarized to form a "formal description language". When the service development apparatus performs development for a service, the "formal description language" is also used, and the orchestration apparatus is actually an execution engine of formal description. In an instantiation process of a service package, the execution engine first completes decomposition of a customized service into element services, then selects a suitable resource from the current instance apparatus or the planning resource providing apparatus, and finally combines these resources to form required resource data corresponding to the customized service.

The planning resource providing apparatus is configured to provide a resource of a network infrastructure, for example, an IP address pool. After a customer subscription request is decomposed by the orchestration apparatus, if an operation such as establishing a network element requires some network resources, for example, if an IP address needs to be assigned, the network resources are obtained from the planning resource providing apparatus.

The check apparatus is configured to process the currently running instance data obtained from the current instance apparatus and the instance data of the customized service to obtain final instance data suitable for a network.

Optionally, the check apparatus is specifically configured to: process the instance data of the customized service and the currently running instance data to obtain expected network running data, where the expected network running data meets a network running requirement; and obtain the final instance data suitable for a network according to the expected network running data and the currently running instance data.

Optionally, the check apparatus is specifically configured to: combine the instance data of the customized service and the currently running instance data to obtain combined data; perform network enabling check on the combined data; and when the network enabling check fails, adjust the combined data to obtain the expected network running data that meets the network running requirement.

The check apparatus combines the instance data of the customized service and the currently running instance data to generate the combined data. The combined data represents a network status in which a requirement is activated. Therefore, data check and presentation/adjustment may be performed on the combined data to obtain the expected network running data. The final instance data suitable for a network is obtained according to the expected network running data and the currently running instance data, to ensure that targeted and planned resources and services do not conflict with existing resources and services on a live network, and activation can truly succeed.

The enabling apparatus is configured to configure the final instance data on a network element. The final instance data runs on the network element, to provide a user with a service corresponding to the customized service.

The enabling apparatus generates, according to the final instance data, interface data finally sent to each network element entity. The final instance data needs to be converted into interface data of a specific network element at the enabling apparatus, and then sent to each network element to take effect. Various heterogeneous interfaces from multiple vendors are related, and therefore data conversion needs to be performed. An interface capability of each network element is registered with the enabling apparatus, and the enabling apparatus has interface capability information of each network element.

The runtime management apparatus is configured to manage software loaded for each specific service.

The orchestration control apparatus may transmit the instance data of the customized service between the orchestration apparatus and the check apparatus.

The orchestration control apparatus may also transmit the final instance data between the check apparatus and the enabling apparatus.

The orchestration control apparatus is further configured to register the final instance data of the customized service with the current instance apparatus.

The current instance apparatus is configured to manage the final instance data of the customized service.

Actually, division of the service development (or develop) apparatus, the catalog apparatus, the current instance (or current) apparatus, the resource providing (or prepare) apparatus, the check (or plan) apparatus, the orchestration apparatus, the enabling (or activation) apparatus, and the runtime management (or runtime) apparatus is division of data functions. On the basis of a capability of having data, that is, a capability of providing a service, eight data partitions are abstracted: a DevelopArea, a CatalogArea, an OrchestrationArea, a PrepareArea, a PlanArea, a CurrentArea, an ActivationArea, and a RuntimeArea. Each partition manages related data and provides a related service for the outside.

Figure 2A:
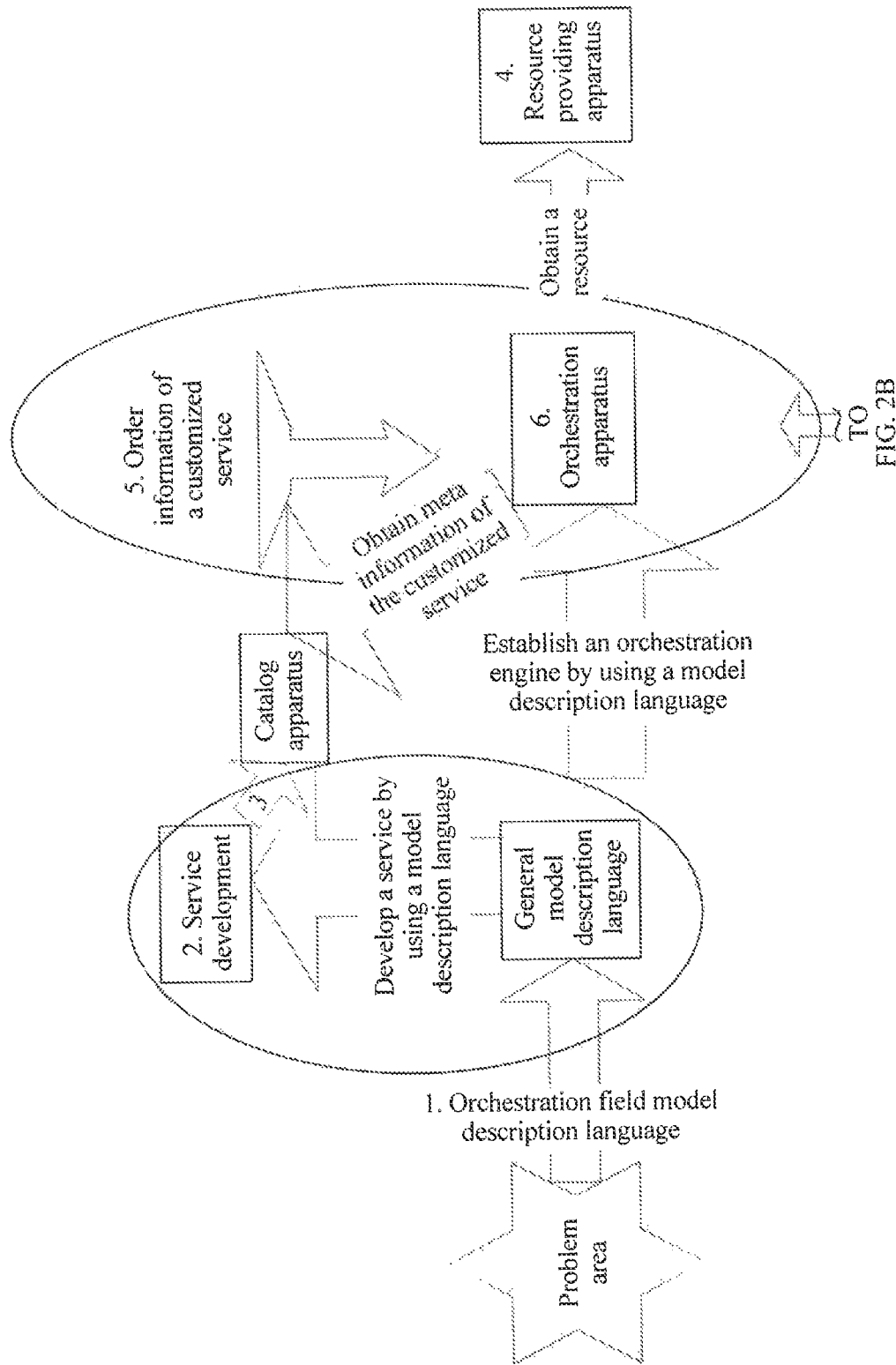

Based on the partitions described in FIG. 1, the following further describes the service and resource orchestration system in this embodiment of the present invention with reference to FIG. 2A and FIG. 2B.

As shown in FIG. 2A and FIG. 2B, another embodiment of a service and resource orchestration system according to an embodiment of the present invention includes the following steps.

Step 1. An orchestration system developer may extract a common concept and logic in a problem area, define a "model description language," and develop an "orchestration engine" that can explain and execute the description language.

Step 2. A service developer develops and describes, by using the "model description language," a service required by the market, and in a service development process, a "service development apparatus" performs development and testing.

For example, network acceleration, wireless signal quality assurance, anti-pornography, and anti-virus are performed for a user group in an enterprise.

Step 3. The service developer releases a developed service on a catalog apparatus, and the catalog apparatus releases, to the outside, a service that can be sold.

Step 4. A basic resource planner plans basic resources for a network, and releases the basic resources to a planning resource providing apparatus, where the resources are still not enabled on the network, and the basic resources are to be gradually consumed in future service sales.

Step 5. A customer order manager writes specific detailed order information according to a service definition and template released by the catalog apparatus.

Step 6. After an order is confirmed, submit the order to an orchestration apparatus for service decomposition, and generate instance data of a customized service, where the instance data of the customized service represents a specific requirement of the customized service for a current network.

Step 7. Collect data and a status of the current network from network elements of the network, where data stored in a current instance apparatus represents a status of the current network.

Step 8. A check apparatus combines the data in the current instance apparatus and the instance data that is of the customized service and obtained by means of orchestration by the orchestration apparatus, to generate expected network running data, where the expected network running data represents a network status in which the service is enabled, so that network-wide status consistency check is performed, and a service activation success rate is ensured, and after verification is passed, the check apparatus compares the expected network running data with currently running instance data to generate incremental data of Delta, and uses the incremental data of Delta as final instance data of the customized service.

Step 9. An enabling apparatus converts the final instance data generated by the check apparatus into interface data (a frame structure, a file structure, a communication protocol, transaction control, and the like) of a network element, and delivers the interface data to the network element.

Step 10. A runtime management apparatus loads specific protocol-related software according to an indication of the enabling apparatus, and performs lifecycle management on these running entities.

As described in FIG. 1 and FIG. 2A and FIG. 2B, division of the service development (or develop) apparatus, the catalog apparatus, the current instance (or current) apparatus, the resource providing (or prepare) apparatus, the check (or plan) apparatus, the orchestration apparatus, the enabling (or activation) apparatus, and the runtime management (or runtime) apparatus is division of data functions. On the basis of a capability of having data, that is, a capability of providing a service, eight data partitions are abstracted: a DevelopArea, a CatalogArea, an OrchestrationArea, a PrepareArea, a PlanArea, a CurrentArea, an ActivationArea, and a RuntimeArea. Each partition manages related data and provides a related service for the outside. The following describes data partitions in this embodiment of the present invention in different indication forms with reference to FIG. 3.

Figure 3:
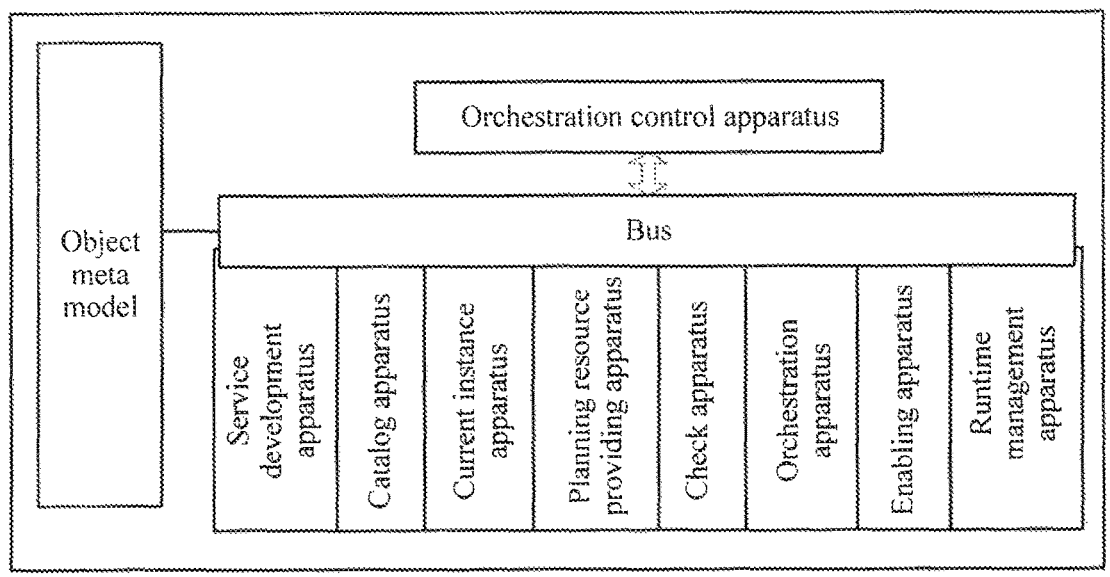
FIG. 3 is a schematic diagram of another embodiment of a service and resource orchestration system according to an embodiment of the present invention.

As shown in FIG. 3, each "partition" has data, and data in these partitions represents a capability of providing a service, and provides a service of a standard interface for the outside. The standard interface is defined by an "object meta model" (M2 Model). Each "partition" in FIG. 3 may be deployed according to an independent service in a service-oriented architecture (Service-oriented architecture, "SOA" for short).

A specific domain area (SpecificDomainArea) in FIG. 3 is a service of a specific service domain, for example, a domain name system (Domain Name System, "DNS" for short) service and an Internet Protocol (Internet Protocol, "IP" for short) address assignment service.

Figure 4A:
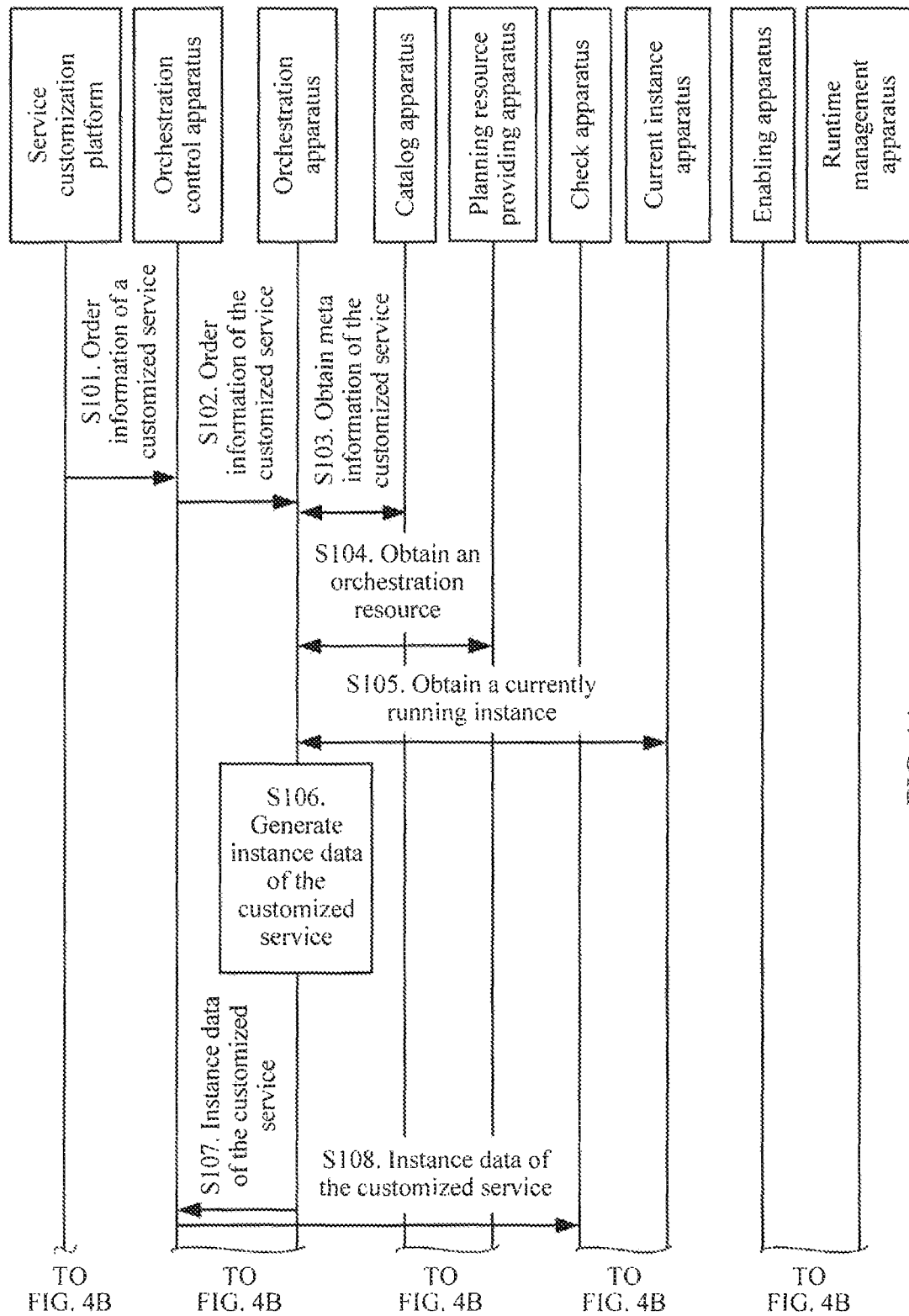
FIG. 4A and FIG. 4B are a schematic diagram of another embodiment of a service and resource orchestration system according to an embodiment of the present invention.
Figure 4B:
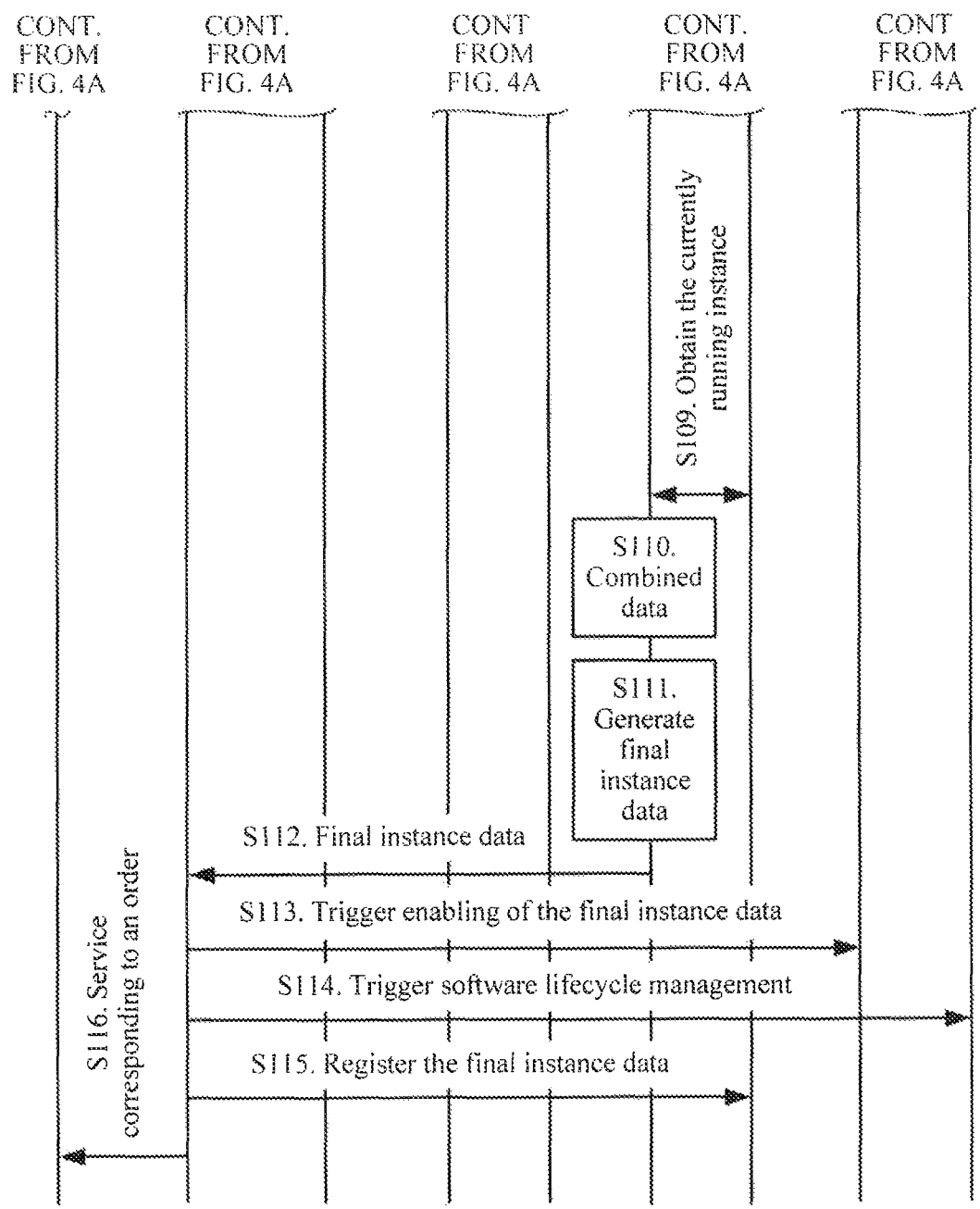

On the basis of the service and resource orchestration systems described in FIG. 1 to FIG. 3, a service orchestration process is described in an embodiment of the present invention with reference to FIG. 4A and FIG. 4B.

S101. The service customization platform obtains order information of a customized service.

A service customization platform Portal represents an order management system, and a customer writes a user requirement order in the Portal. After being confirmed, the requirement order is submitted to the orchestration control apparatus for service enabling.

S102. The orchestration control apparatus sends the order information of the customized service to the orchestration apparatus, where the customized service is a service released on the catalog apparatus.

S103. The orchestration apparatus obtains meta information of the customized service from the catalog apparatus.

S104. The orchestration apparatus obtains resource data of the customized service from the planning resource providing apparatus.

S105. The orchestration apparatus obtains a live network resource available to the customized service from the current instance apparatus.

S106. The orchestration apparatus obtains, from the planning resource providing apparatus according to the order information and the resource requirement information, a resource required by the customized service, and generates instance data of the customized service.

S107. The orchestration apparatus sends the instance data of the customized service to the orchestration control apparatus S108. The orchestration control apparatus sends the instance data of the customized service to the check apparatus.

S109. The check apparatus obtains a currently running instance of a live network from the current instance apparatus.

S110. The check apparatus combines the instance data of the customized service and the currently running instance data to obtain combined data.

The combined data represents a future network status in which a customer requirement is enabled at a network element.

Network enabling check is performed on the combined data.

When the network enabling check fails, the combined data is adjusted to obtain expected network running data that meets a network running requirement.

The check apparatus performs data consistency, validity, and compatibility check on the combined data, and may perform presentation or even manual fine tuning.

S111. The check apparatus obtains final instance data suitable for a network according to the expected network running data and the currently running instance data.

If combined check verification data may successfully and properly take effect at a network element, the check apparatus generates the final instance data of the customized service.

S112. The check apparatus sends the final instance data of the customized service to the orchestration control apparatus.

S113. The orchestration control apparatus triggers the enabling apparatus to enable the final instance data of the customized service, where the final instance data of the customized service is converted into interface data of a specific network element by the enabling apparatus, and a configuration operation is performed on the network element according to an interface transaction procedure of the specific network element.

S114. The orchestration control apparatus triggers the runtime management apparatus to load software specially for the customized service, for example, to load software for providing a customer with a proxy for self-service management on a service of the customer.

S115. The orchestration control apparatus registers the newly established final instance data of the customized service with the current instance apparatus, and the current instance apparatus performs real-time monitoring and service assurance on the service according to the meta information of the customized service obtained from the catalog apparatus.

S116. The orchestration control apparatus returns a service corresponding to the order to the service customization platform.

In this embodiment of the present invention, a network resource is orchestrated according to a service requirement, and a resource orchestration process and resource orchestration logic are extremely complex because of diversity of service requirements and network resources. In the present embodiment, based on (1) data classification based on cohesion of all types of data, (2) role division of participants, and (3) a basic process in an orchestration process, a system is divided into sub-systems: partitions that provide basic services. Each partition represents a basic service in an orchestration system, and a standard sub-service interface is provided in each service. In the present patent, coupled data, participant roles, and an orchestration process are organically combined, a complex system is decomposed, and sub-systems obtained by means of decomposition are separately established. On the basis of completing a system function, an SOA-based implementation and SOA-based service deployment are facilitated.

In a partition-based network service orchestration system, previous functions such as network resource monitoring, network resource planning, network resource optimization, and network resource configuration of a network are organically and automatically combined to meet a service subscription requirement of a customer. Manual intervention is reduced, and a service response time is reduced.

In the partition-based network service orchestration system, interfaces between service areas are obtained by means of division. The interfaces between service areas are defined by using an M2 meta model. The M2 meta model provides system decoupling, and more importantly, provides development of new service description languages, and development efficiency of a new service is greatly improved.

With reference to the embodiments of the service and resource orchestration systems described in some embodiments of FIG. 1 to FIG. 4A and FIG. 4B, the following describes an embodiment of a service and resource orchestration method in an embodiment of the present invention.

Figure 5:
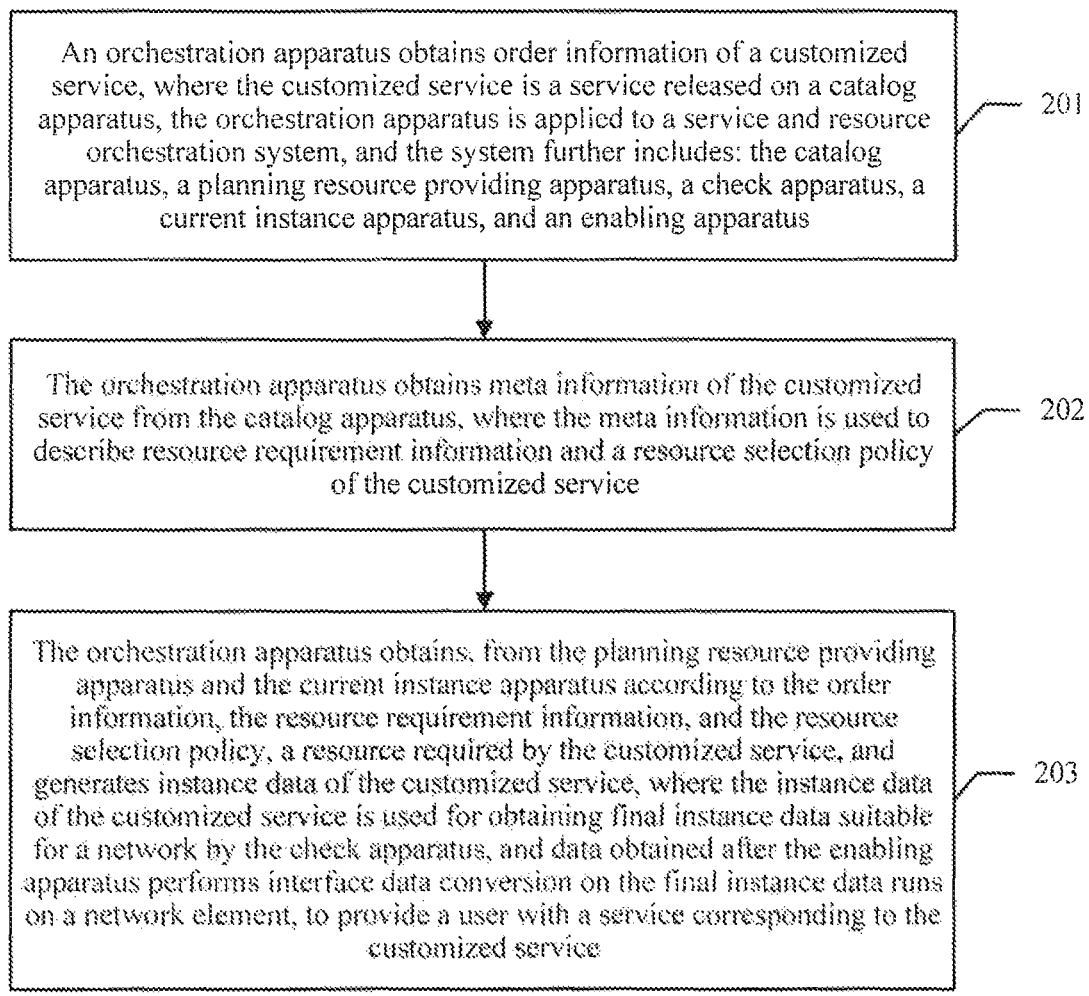
FIG. 5 is a schematic diagram of an embodiment of a service and resource orchestration method according to an embodiment of the present invention.

Referring to FIG. 5, an embodiment of a service and resource orchestration method according to an embodiment of the present invention includes the following steps.

201. The orchestration apparatus obtains order information of a customized service, where the customized service is a service released on the catalog apparatus, the orchestration apparatus is applied to a service and resource orchestration system, and the system further includes: the catalog apparatus, a planning resource providing apparatus, a check apparatus, a current instance apparatus, and an enabling apparatus.

202. The orchestration apparatus obtains meta information of the customized service from the catalog apparatus, where the meta information is used to describe resource requirement information and a resource selection policy of the customized service.

203. The orchestration apparatus obtains, from the planning resource providing apparatus and the current instance apparatus according to the order information, the resource requirement information, and the resource selection policy, a resource required by the customized service, and generates instance data of the customized service, where the instance data of the customized service is used for obtaining final instance data suitable for a network by the check apparatus, and data obtained after the enabling apparatus performs interface data conversion on the final instance data runs on a network element, to provide a user with a service corresponding to the customized service.

During current development of a service in the prior art, after a user proposes a service requirement, development is performed for the service, and then a corresponding resource is orchestrated for the service and is provided for the user for use. Consequently, service and resource orchestration efficiency is low. In contrast, according to the service and resource orchestration method provided in this embodiment of the present invention, a resource may be automatically orchestrated and run for the customized service, thereby improving service and resource orchestration efficiency.

Optionally, on the basis of the embodiment corresponding to FIG. 5, in a first optional embodiment of the service and resource orchestration method provided in this embodiment of the present invention, after obtaining the resource required by the customized service, the orchestration apparatus decomposes the customized service, and configures a required resource for a decomposed customized service according to the orchestration algorithm.

Optionally, on the basis of the embodiment corresponding to FIG. 5 or the first optional embodiment, in a second optional embodiment of the service and resource orchestration method provided in this embodiment of the present invention, the orchestration apparatus obtains the order information of the customized service from an orchestration control apparatus, where the order information of the customized service is obtained by the orchestration control apparatus from a service customization platform.

Figure 6:
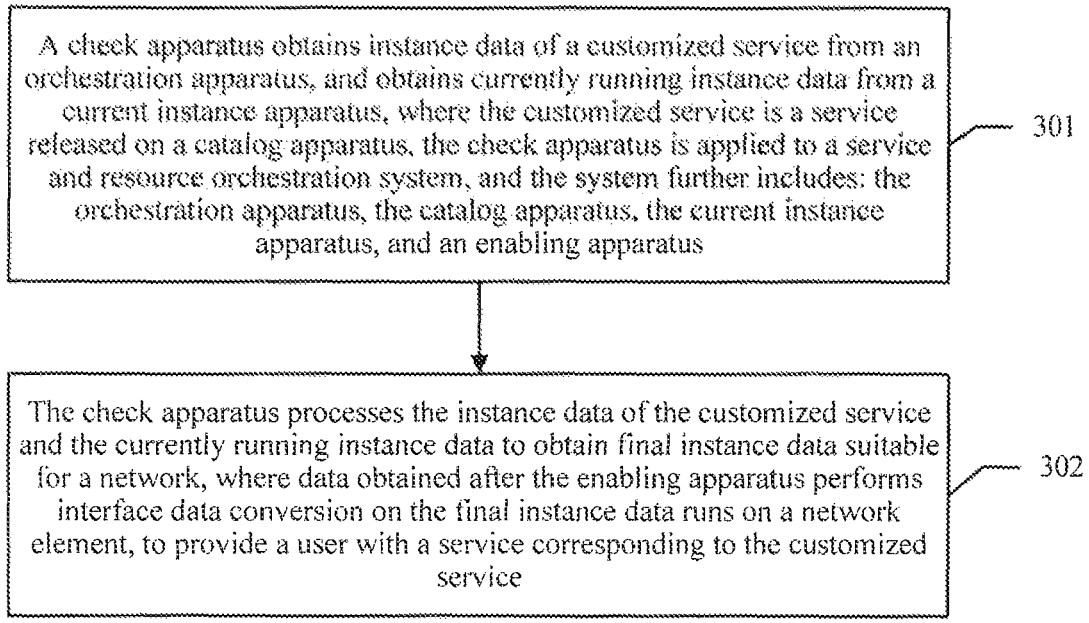
FIG. 6 is a schematic diagram of another embodiment of a service and resource orchestration method according to an embodiment of the present invention.

Referring to FIG. 6, another embodiment of a service and resource orchestration method according to an embodiment of the present invention includes the following steps.

301. A check apparatus obtains instance data of a customized service from the orchestration apparatus, and obtains currently running instance data from the current instance apparatus, where the customized service is a service released on the catalog apparatus, the check apparatus is applied to a service and resource orchestration system, and the system further includes: the orchestration apparatus, the catalog apparatus, the current instance apparatus, and an enabling apparatus.

302. The check apparatus processes the instance data of the customized service and the currently running instance data to obtain final instance data suitable for a network, where data obtained after the enabling apparatus performs interface data conversion on the final instance data runs on a network element, to provide a user with a service corresponding to the customized service.

Currently, during development of a service, after a user proposes a service requirement, development is performed for the service, and then a corresponding resource is orchestrated for the service and is provided for the user for use. Consequently, service and resource orchestration efficiency is low. In contrast, according to the service and resource orchestration method provided in this embodiment of the present invention, a resource may be automatically orchestrated and run for the customized service, thereby improving service and resource orchestration efficiency.

Optionally, on the basis of the embodiment corresponding to FIG. 6, in a first optional embodiment of the service and resource orchestration method provided in this embodiment of the present invention, the processing, by the check apparatus, the instance data of the customized service and the currently running instance data to obtain final instance data suitable for a network may include: processing, by the check apparatus, the instance data of the customized service and the currently running instance data to obtain expected network running data, where the expected network running data meets a network running requirement; and obtaining, by the check apparatus, the final instance data suitable for a network according to the expected network running data and the currently running instance data.

Optionally, on the basis of the first optional embodiment, in a second optional embodiment of the service and resource orchestration method provided in this embodiment of the present invention, the processing, by the check apparatus, the instance data of the customized service and the currently running instance data to obtain expected network running data may include: combining, by the check apparatus, the instance data of the customized service and the currently running instance data to obtain combined data; performing, by the check apparatus, network enabling check on the combined data; and when the network enabling check fails, adjusting, by the check apparatus, the combined data to obtain the expected network running data that meets the network running requirement.

For the foregoing embodiments corresponding to FIG. 5 and FIG. 6 or any optional embodiments, refer to related descriptions of the system embodiments in FIG. 1 to FIG. 4A and FIG. 4B for understanding. Details are not described in the method embodiments again.

With reference to the embodiments of the service and resource orchestration systems described in some embodiments of FIG. 1 to FIG. 4A and FIG. 4B and the foregoing service and resource orchestration method embodiments, the following describes an orchestration apparatus and a check apparatus in an embodiment of the present invention.

Figure 7:
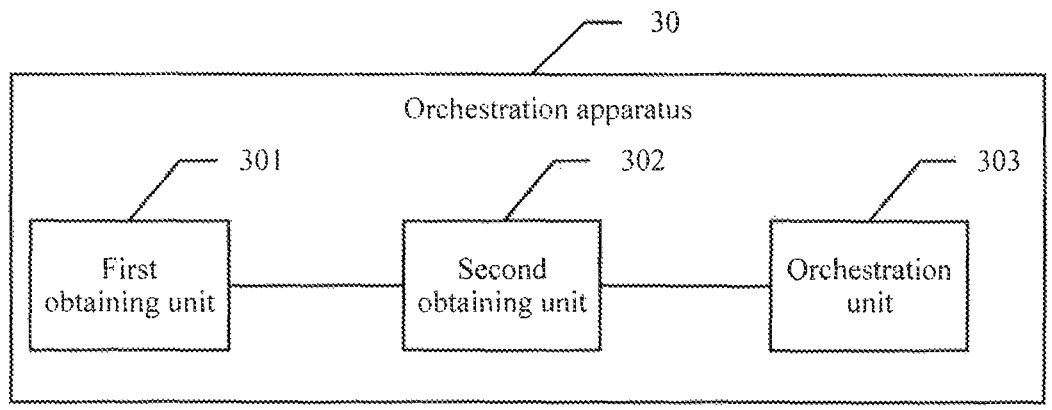
FIG. 7 is a schematic diagram of an embodiment of an orchestration apparatus according to an embodiment of the present invention.

Referring to FIG. 7, an orchestration apparatus 40 provided in this embodiment of the present invention is applied to a service and resource orchestration system. The system further includes: a catalog apparatus, a planning resource providing apparatus, a check apparatus, a current instance apparatus, and an enabling apparatus. The orchestration apparatus 40 includes a first obtaining unit 401, configured to obtain order information of a customized service, where the customized service is a service released on the catalog apparatus. The orchestration apparatus 40 also includes a second obtaining unit 402, configured to obtain, from the catalog apparatus, meta information of the customized service obtained by the first obtaining unit 401, where the meta information is used to describe resource requirement information and a resource selection policy of the customized service. The orchestration apparatus 40 further includes an orchestration unit 403, configured to: obtain, from the planning resource providing apparatus and the current instance apparatus according to the order information, the resource requirement information, and the resource selection policy obtained by the second obtaining unit 402, a resource required by the customized service, and generate instance data of the customized service, where the instance data of the customized service is used for obtaining final instance data suitable for a network, and data obtained after the enabling apparatus performs interface data conversion on the final instance data runs on a network element, to provide a user with a service corresponding to the customized service.

During current development of a service in the prior art, after a user proposes a service requirement, development is performed for the service, and then a corresponding resource is orchestrated for the service and is provided for the user for use. Consequently, service and resource orchestration efficiency is low. In contrast, the orchestration apparatus provided in this embodiment of the present invention may automatically orchestrate and run a resource for the customized service, thereby improving service and resource orchestration efficiency.

Optionally, the orchestration unit 403 is further configured to, after obtaining the resource required by the customized service, decompose the customized service, and configure a required resource for a decomposed customized service according to the orchestration algorithm.

Optionally, the first obtaining unit 401 is specifically configured to obtain the order information of the customized service from an orchestration control apparatus. The order information of the customized service is obtained by the orchestration control apparatus from a service customization platform.

Figure 8:
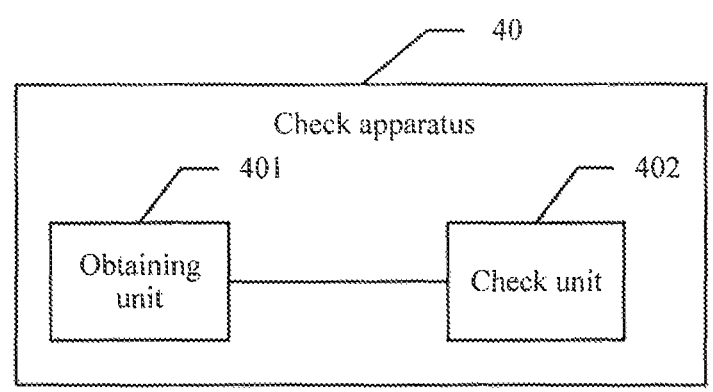
FIG. 8 is a schematic diagram of an embodiment of a check apparatus according to an embodiment of the present invention.

Referring to FIG. 8, a check apparatus 50 provided in this embodiment of the present invention is applied to a service and resource orchestration system. The system further includes: an orchestration apparatus, a catalog apparatus, a current instance apparatus, and an enabling apparatus. The check apparatus 50 includes an obtaining unit 501, configured to: obtain instance data of a customized service from the orchestration apparatus, and obtain currently running instance data from the current instance apparatus, where the customized service is a service released on the catalog apparatus. The check apparatus 50 also includes a check unit 502, configured to process the instance data of the customized service and the currently running instance data that are obtained by the obtaining unit 501, to obtain final instance data suitable for a network, where data obtained after the enabling apparatus performs interface data conversion on the final instance data runs on a network element, to provide a user with a service corresponding to the customized service.

During current development of a service in the prior art, after a user proposes a service requirement, development is performed for the service, and then a corresponding resource is orchestrated for the service and is provided for the user for use. Consequently, service and resource orchestration efficiency is low. In contrast, the check apparatus provided in this embodiment of the present invention may automatically orchestrate and run a resource for the customized service, thereby improving service and resource orchestration efficiency.

Optionally, the check unit 502 is specifically configured to: process the instance data of the customized service and the currently running instance data to obtain expected network running data, where the expected network running data meets a network running requirement; and obtain the final instance data suitable for a network according to the expected network running data and the currently running instance data.

Optionally, the check unit 502 is specifically configured to: combine the instance data of the customized service and the currently running instance data to obtain combined data; perform network enabling check on the combined data; and when the network enabling check fails, adjust the combined data to obtain the expected network running data that meets the network running requirement.

Figure 9:
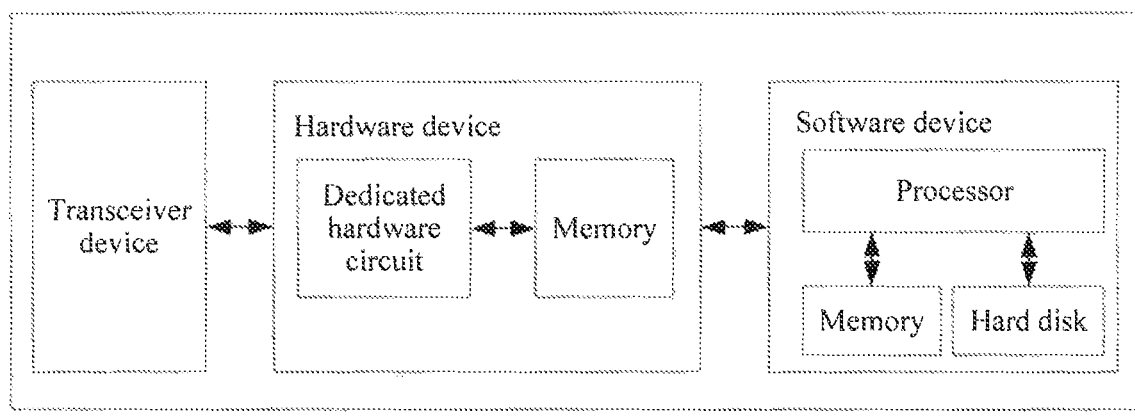
FIG. 9 is a schematic diagram of another embodiment of an orchestration apparatus or a check apparatus according to an embodiment of the present invention.

An embodiment provides a hardware structure of an orchestration apparatus or a check apparatus. Referring to FIG. 9, the hardware structure of the orchestration apparatus or the check apparatus may include: three parts: a transceiver device, a software device, and a hardware device.

The transceiver device is a hardware circuit configured to complete package sending and receiving.

The hardware device may also be referred to as a "hardware processing module," or may be simply referred to as "hardware." The hardware device mainly includes a hardware circuit that implements some specific functions based on a dedicated hardware circuit such as an FPGA or an ASIC (that may cooperate with another auxiliary device, such as a memory). A processing speed of the hardware device is generally higher than that of a general purpose processor. However, it is difficult to change a function of the dedicated hardware circuit after the function is customized. Therefore, the dedicated hardware circuit cannot be flexibly implemented, and is generally configured to implement some fixed functions. It should be noted that, in actual application, the hardware device may also include processors such as an MCU (microcontroller or microprocessor, such as a single-chip microcomputer) or a CPU (central processing unit). However, a main function of these processors is not to complete processing of big data but to perform some control. In this application scenario, a system with which these devices match is a hardware device.

The software device (or simply referred to as "software") mainly includes a general purpose processor (for example, a CPU) and some auxiliary devices (for example, storage devices such as a memory and a hard disk). A processor may be provided with a corresponding processing function by means of programming. When the processor is implemented by software, the processor may be flexibly configured according to a service but a processing speed is generally lower than that of the hardware device. After the software completes processing, processed data may be sent by the transceiver device by using the hardware device, or processed data may be sent to the transceiver device by using an interface connected to the transceiver device.

In this embodiment, the transceiver device is configured to obtain order information of a customized service.

Other functions of the software device and the hardware device are described in detail in the foregoing embodiments, and are not described herein.

With reference to the accompanying drawings, the following provides a detailed description of a technical solution in which sending and receiving may be implemented by an input/output I/O device (for example, a network adapter), and a processing unit may be implemented by executing a program or an instruction in a memory by a processor.

Figure 10:
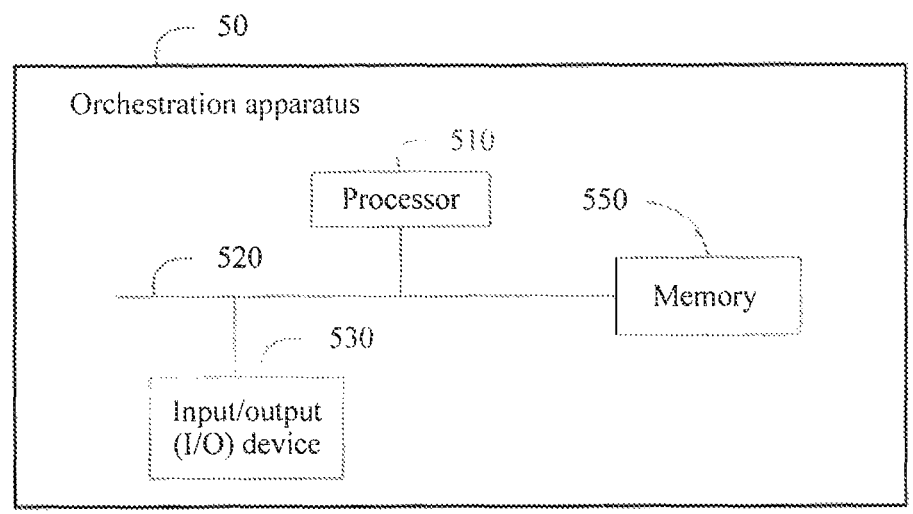
FIG. 10 is a schematic diagram of another embodiment of an orchestration apparatus according to an embodiment of the present invention.

FIG. 10 is a schematic structural diagram of an orchestration apparatus 50 according to an embodiment of the present invention. The orchestration apparatus 50 includes a processor 510, a memory 550, and an input/output I/O device 530. The memory 550 may include a read-only memory (ROM) and a random access memory (RAM), and provides an instruction and data for the processor 510. A part of the memory 550 may further include a non-volatile random access memory (NVRAM).

In some implementations, the memory 550 stores the following element: an executable module or a data structure, a subset of an executable module or a data structure, or an extended set of an executable module or a data structure.

In this embodiment of the present invention, by invoking an operation instruction stored in the memory 550 (the operation instruction may be stored in an operating system), the processor 510 is configured to: obtain order information of a customized service, where the customized service is a service released on the catalog apparatus; obtain meta information of the customized service from the catalog apparatus, where the meta information is used to describe resource requirement information and a resource selection policy of the customized service; and obtain, from the planning resource providing apparatus and the current instance apparatus according to the order information, the resource requirement information, and the resource selection policy, a resource required by the customized service, and generate instance data of the customized service, where the instance data of the customized service is used for obtaining final instance data suitable for a network by the check apparatus, and data obtained after the enabling apparatus performs interface data conversion on the final instance data runs on a network element, to provide a user with a service corresponding to the customized service.

Currently, during development of a service, after a user proposes a service requirement, development is performed for the service, and then a corresponding resource is orchestrated for the service and is provided for the user for use. Consequently, service and resource orchestration efficiency is low. In contrast, the orchestration apparatus provided in this embodiment of the present invention may automatically orchestrate and run a resource for the customized service, thereby improving service and resource orchestration efficiency.

The processor 510 controls an operation of the orchestration apparatus 50, and the processor 510 may be further referred to as a CPU. The memory 550 may include a read-only memory and a random access memory, and provides an instruction and data for the processor 510. A part of the memory 550 may further include a NVRAM. In specific application, all components of the orchestration apparatus 50 are coupled together by using a bus system 520. The bus system 520 may include a power bus, a control bus, a status signal bus, and the like in addition to a data bus. However, for clear description, various buses in the figure are marked as the bus system 520.

The method disclosed in the foregoing embodiments of the present invention may be applied to the processor 510, or implemented by the processor 510. The processor 510 may be an integrated circuit chip and has a signal processing capability. In an implementation process, the steps in the foregoing method may be completed by means of an integrated logic circuit of hardware in the processor 510 or an instruction in a form of software. The processor 510 may be a general processor, a digital signal processor (DSP), an application-specific integrated circuit (ASIC), a field programmable gate array (FPGA) or another programmable logic device, a discrete gate or transistor logic device, or a discrete hardware assembly. The processor 510 may implement or perform the methods, steps, and logical block diagrams disclosed in the embodiments of the present invention. The general purpose processor may be a microprocessor, or the processor may be any normal processor, or the like. The steps of the method disclosed with reference to the embodiments of the present invention may be directly performed and completed by using a hardware decoding processor, or performed and completed by using a combination of hardware and software modules in a decoding processor. The software module may be located in a storage medium, such as a random access memory, a flash memory, a read-only memory, a programmable read-only memory, an electrically-erasable programmable memory, or a register. The storage medium is located in the memory 550. The processor 510 reads information in the memory 550, and completes the steps of the foregoing method in combination with hardware of the processor 510.

Optionally, the processor 510 is further configured to: after obtaining the resource required by the customized service, decompose the customized service, and configure a required resource for a decomposed customized service according to the orchestration algorithm.

Optionally, the processor 510 is specifically configured to obtain the order information of the customized service from an orchestration control apparatus. The order information of the customized service is obtained by the orchestration control apparatus from a service customization platform.

Figure 11:
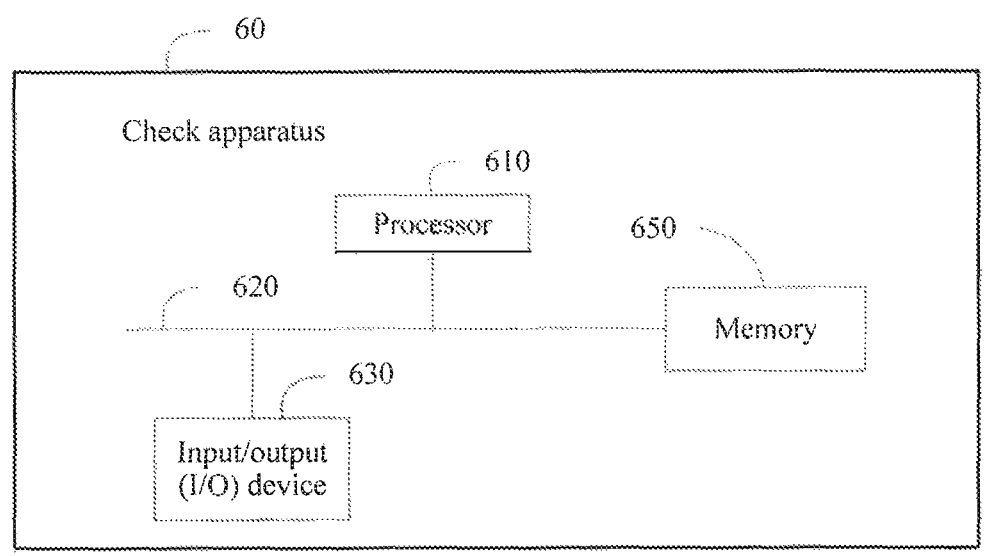
FIG. 11 is a schematic diagram of another embodiment of a check apparatus according to an embodiment of the present invention.

FIG. 11 is a schematic structural diagram of a check apparatus 60 according to an embodiment of the present invention. The check apparatus 60 includes a processor 610, a memory 650, and an input/output I/O device 630. The memory 650 may include a read-only memory and a random access memory, and provides an instruction and data for the processor 610. A part of the memory 650 may further include a NVRAM.

In some implementations, the memory 650 stores the following element: an executable module or a data structure, a subset of an executable module or a data structure, or an extended set of an executable module or a data structure.

In this embodiment of the present invention, by invoking an operation instruction stored in the memory 650 (the operation instruction may be stored in an operating system), the processor 610 is configured to: obtain instance data of a customized service from the orchestration apparatus, and obtain currently running instance data from the current instance apparatus, where the customized service is a service released on the catalog apparatus; and process the instance data of the customized service and the currently running instance data to obtain final instance data suitable for a network, where data obtained after the enabling apparatus performs interface data conversion on the final instance data runs on a network element, to provide a user with a service corresponding to the customized service.

During current development of a service in the prior art, after a user proposes a service requirement, development is performed for the service, and then a corresponding resource is orchestrated for the service and is provided for the user for use. Consequently, service and resource orchestration efficiency is low. In contrast, the check apparatus provided in this embodiment of the present invention may automatically orchestrate and run a resource for the customized service, thereby improving service and resource orchestration efficiency.

The processor 610 controls an operation of the check apparatus 60, and the processor 610 may be further referred to as a CPU (Central Processing Unit, central processing unit). The memory 650 may include a read-only memory and a random access memory, and provides an instruction and data for the processor 610. A part of the memory 650 may further include a non-volatile random access memory (NVRAM). In specific application, all components of the check apparatus 60 are coupled together by using a bus system 620. The bus system 620 may include a power bus, a control bus, a status signal bus, and the like in addition to a data bus. However, for clear description, various buses in the figure are marked as the bus system 620.

The method disclosed in the foregoing embodiments of the present invention may be applied to the processor 610, or implemented by the processor 610. The processor 610 may be an integrated circuit chip and has a signal processing capability. In an implementation process, the steps in the foregoing method may be completed by means of an integrated logic circuit of hardware in the processor 610 or an instruction in a form of software. The processor 610 may be a general processor, a digital signal processor (DSP), an application-specific integrated circuit (ASIC), a field programmable gate array (FPGA) or another programmable logic device, a discrete gate or transistor logic device, or a discrete hardware assembly. The processor 610 may implement or perform the methods, steps, and logical block diagrams disclosed in the embodiments of the present invention. The general purpose processor may be a microprocessor, or the processor may be any normal processor, or the like. The steps of the method disclosed with reference to the embodiments of the present invention may be directly performed and completed by using a hardware decoding processor, or performed and completed by using a combination of hardware and software modules in a decoding processor. The software module may be located in a mature storage medium in the art, such as a random access memory, a flash memory, a read-only memory, a programmable read-only memory, an electrically-erasable programmable memory, or a register. The storage medium is located in the memory 650. The processor 610 reads information in the memory 650, and completes the steps of the foregoing method in combination with hardware of the processor 610.

Optionally, the processor 610 is specifically configured to: process the instance data of the customized service and the currently running instance data to obtain expected network running data, where the expected network running data meets a network running requirement; and obtain the final instance data suitable for a network according to the expected network running data and the currently running instance data.

Optionally, the processor 610 is specifically configured to: combine the instance data of the customized service and the currently running instance data to obtain combined data; perform network enabling check on the combined data; and when the network enabling check fails, adjust the combined data to obtain the expected network running data that meets the network running requirement.

A person of ordinary skill in the art may understand that all or some of the steps of the methods in the embodiments may be implemented by a program instructing relevant hardware. The program may be stored in a computer readable storage medium. The storage medium may include: a ROM, a RAM, a magnetic disk, or an optical disc.

The service and resource orchestration system and method, and an apparatus provided in the embodiments of the present invention are described in detail above. In this specification, specific examples are used to illustrate the principle and implementations of the present invention, and the foregoing description of the embodiments is intended only to help understand the method and core idea of the present invention. In addition, a person of ordinary skill in the art may make modifications in terms of the specific implementations and the application range according to the ideas of the present invention. In conclusion, the content of this specification shall not be construed as a limitation on the present invention.

What is claimed is:

1. A method, comprising:
   obtaining, by an orchestration apparatus of a service and resource orchestration system, order information of a customized service, wherein the customized service is a service released on a catalog apparatus of the service and resource orchestration system;
   obtaining, by the orchestration apparatus, meta information of the customized service from the catalog apparatus, wherein the meta information describes resource requirement information and a resource selection policy of the customized service;
   obtaining, by the orchestration apparatus, a resource required by the customized service from a planning resource providing apparatus or a current instance apparatus of the service and resource orchestration system according to the order information, the resource requirement information, and the resource selection policy; and
   generating instance data of the customized service, wherein a check apparatus of the service and resource orchestration system obtains final instance data for a network based on the instance data of the customized service, wherein the final instance data runs on a network element after an enabling apparatus of the service and resource orchestration system performs interface data conversion on the final instance data, to provide a user with a service corresponding to the customized service.

2. The method according to claim 1, wherein the meta information further comprises an orchestration process; and
   after obtaining the resource required by the customized service, the orchestration apparatus decomposes the customized service, and configures a required resource for a decomposed customized service according to the orchestration process.

3. The method according to claim 1, wherein the obtaining order information of the customized service comprises:
   obtaining, by the orchestration apparatus, the order information of the customized service from an orchestration control apparatus, wherein the order information of the customized service is obtained by the orchestration control apparatus from a service customization platform.

4. The method according to claim 1, wherein the meta information comprises class definition information, inter-class relationship definition information, and a conversion script of a service.

5. The method according to claim 1, wherein the final instance data for the network includes resources which do not conflict with active resources of the network.

6. The method according to claim 1, wherein the final instance data is obtained by processing the instance data and currently running instance data to obtain expected network running data, the expected network running data meeting a network running requirement, and obtaining the final instance data according to the expected network running data and the currently running instance data.

7. The method according to claim 6, wherein the instance data and currently running instance data are combined to obtain combined data, and the expected network running data is obtained by performing data check and presentation/adjustment on the combined data.

8. The method according to claim 1, further comprising:
   transmitting, by the orchestration apparatus, the instance data of the customized service to the check apparatus through an orchestration control apparatus, the orchestration control apparatus controlling service and resource orchestration.

9. An orchestration apparatus of a service and resource orchestration system, comprising:
   a first obtaining sub-apparatus, configured to obtain order information of a customized service, wherein the customized service is a service released on a catalog apparatus of the service and resource orchestration system;
   a second obtaining sub-apparatus, configured to obtain, from the catalog apparatus, meta information of the customized service obtained by the first obtaining sub-apparatus, wherein the meta information describes resource requirement information and a resource selection policy of the customized service; and
   an orchestration sub-apparatus, configured to:
      obtain a resource required by the customized service from a planning resource providing apparatus or a current instance apparatus of the service and resource orchestration system according to the order information, the resource requirement information, and the resource selection policy, and
      generate instance data of the customized service, wherein final instance data for a network is obtained based on the instance data of the customized service, wherein the final instance data runs on a network element after an enabling apparatus of the service and resource orchestration system performs interface data conversion on the final instance data, to provide a user with a service corresponding to the customized service.

10. The orchestration apparatus according to claim 9, wherein the orchestration sub-apparatus is further configured to:
    after obtaining the resource required by the customized service, decompose the customized service, and configure a required resource for a decomposed customized service according to an orchestration algorithm.

11. The orchestration apparatus according to claim 9, wherein the first obtaining sub-apparatus is configured to obtain the order information of the customized service from an orchestration control apparatus, wherein the order information of the customized service is obtained by the orchestration control apparatus from a service customization platform.

12. The orchestration apparatus according to claim 9, wherein the meta information comprises class definition information, inter-class relationship definition information, and a conversion script of a service.

13. The orchestration apparatus according to claim 9, wherein the final instance data is obtained by processing the instance data and currently running instance data to obtain expected network running data, the expected network running data meeting a network running requirement, and obtaining the final instance data according to the expected network running data and the currently running instance data.

14. The orchestration apparatus according to claim 13, wherein the instance data and currently running instance data are combined to obtain combined data, and the expected network running data is obtained by performing data check and presentation/adjustment on the combined data.

15. A check apparatus of a service and resource orchestration system, comprising:
an obtaining sub-apparatus, configured to:
obtain instance data of a customized service from an orchestration apparatus of the service and resource orchestration system, and
obtain currently running instance data from a current instance apparatus of the service and resource orchestration system, wherein the customized service is a service released on a catalog apparatus of the service and resource orchestration system; and
a check sub-apparatus, configured to process the instance data of the customized service and the currently running instance data to obtain final instance data for a network, wherein the final instance data runs on a network element after an enabling apparatus of the service and resource orchestration system performs interface data conversion on the final instance data, to provide a user with a service corresponding to the customized service.

16. The check apparatus according to claim 15, wherein the check sub-apparatus is configured to:
process the instance data of the customized service and the currently running instance data to obtain expected network running data, wherein the expected network running data meets a network running requirement; and
obtain the final instance data for a network according to the expected network running data and the currently running instance data.

17. The check apparatus according to claim 16, wherein the check sub-apparatus is configured to:
combine the instance data of the customized service and the currently running instance data to obtain combined data;
perform a network enabling check on the combined data; and
when the network enabling check fails, adjust the combined data to obtain the expected network running data that meets the network running requirement.

18. The check apparatus according to claim 16, wherein the instance data and currently running instance data are combined to obtain combined data, and the expected network running data is obtained by performing data check and presentation/adjustment on the combined data.

19. The check apparatus according to claim 15, wherein the final instance data for the network is obtained according to expected network running data and currently running instance data, wherein the final instance data specifies network resources and services which do not conflict with active resources and services of the network.

20. The check apparatus according to claim 15, wherein the check sub-apparatus is further configured to transmit the final instance data to the enabling apparatus through an orchestration control apparatus.

\* \* \* \* \*